(12) United States Patent
Burkhardt et al.

(10) Patent No.: US 10,794,297 B2
(45) Date of Patent: Oct. 6, 2020

(54) METHOD FOR OPERATING A GAS TURBINE INSTALLATION AND A GAS TURBINE INSTALLATION FOR CARRYING OUT THE METHOD

(71) Applicant: Siemens Aktiengesellschaft, Munich (DE)

(72) Inventors: Daniel Burkhardt, Tönisvorst / Vorst (DE); Matthias Stieger, Regensburg (DE)

(73) Assignee: Siemens Aktiengsellschaft, Munich (DE)

( * ) Notice: Subject to any disclaimer, the term of this patent is extended or adjusted under 35 U.S.C. 154(b) by 956 days.

(21) Appl. No.: 15/117,859

(22) PCT Filed: Jan. 21, 2015

(86) PCT No.: PCT/EP2015/051107
§ 371 (c)(1),
(2) Date: Aug. 10, 2016

(87) PCT Pub. No.: WO2015/124359
PCT Pub. Date: Aug. 27, 2015

(65) Prior Publication Data
US 2016/0377000 A1    Dec. 29, 2016

(30) Foreign Application Priority Data
Feb. 18, 2014   (EP) .................................... 14155549

(51) Int. Cl.
*F02C 9/50*   (2006.01)
*F02C 9/28*   (2006.01)
(Continued)

(52) U.S. Cl.
CPC .............. *F02C 9/50* (2013.01); *F01D 21/003* (2013.01); *F02C 3/04* (2013.01); *F02C 7/042* (2013.01);
(Continued)

(58) Field of Classification Search
CPC ...... F02C 9/16; F02C 9/20; F02C 9/28; F02C 9/54; F02C 9/50; F02C 9/00; F02C 9/26;
(Continued)

(56) References Cited

U.S. PATENT DOCUMENTS

| | | | | |
|---|---|---|---|---|
| 2,846,846 A | * | 8/1958 | Mock ........................ | F02C 9/28 60/39.281 |
| 2,931,168 A | * | 4/1960 | Nordwald ................. | F02C 9/54 60/238 |

(Continued)

FOREIGN PATENT DOCUMENTS

| | | |
|---|---|---|
| DE | 102006008483 A1 | 3/2007 |
| EP | 2071157 A1 | 6/2009 |

(Continued)

OTHER PUBLICATIONS

JP Office Action dated Sep. 11, 2017, for JP patent application No. 2016-552576.
(Continued)

*Primary Examiner* — Alain Chau
(74) *Attorney, Agent, or Firm* — Beusse Wolter Sanks & Maire

(57) ABSTRACT

A method for operating a gas turbine installation with a measured compressor inlet temperature (Ti-actual) and a virtually constant turbine inlet temperature (TiTiso), wherein to provide safe operation of the gas turbine installation, an increase in a calculated exhaust gas temperature (ATK) is compensated by a reduced mass flow (m) of a flow medium flowing through a compressor of the gas turbine
(Continued)

installation. An arrangement for operating the gas turbine installation includes a functional unit and a gas turbine installation with a compressor, a turbine, a control system for operating the method.

16 Claims, 5 Drawing Sheets

(51) Int. Cl.
  *F02C 9/20* (2006.01)
  *F02C 9/54* (2006.01)
  *F02C 9/26* (2006.01)
  *F02C 7/042* (2006.01)
  *F01D 21/00* (2006.01)
  *F02C 3/04* (2006.01)
  *F04D 27/00* (2006.01)
(52) U.S. Cl.
  CPC ............... *F02C 9/20* (2013.01); *F02C 9/26* (2013.01); *F02C 9/28* (2013.01); *F02C 9/54* (2013.01); *F04D 27/001* (2013.01); *F04D 27/002* (2013.01); *F05D 2220/32* (2013.01); *F05D 2270/0831* (2013.01); *F05D 2270/112* (2013.01); *F05D 2270/303* (2013.01); *F05D 2270/3032* (2013.01); *F05D 2270/3061* (2013.01); *F05D 2270/44* (2013.01)
(58) Field of Classification Search
  CPC .. F02C 7/04; F02C 7/042; F02C 7/057; F05D 2270/112; F05D 2270/3032; F05D 2270/3061; F05D 2270/44; Y02E 20/16
  See application file for complete search history.

(56) References Cited

U.S. PATENT DOCUMENTS

| | | | | |
|---|---|---|---|---|
| 3,068,648 A * | 12/1962 | Cowles | F02C 9/16 | 60/39.281 |
| 3,973,391 A * | 8/1976 | Reed | F01K 23/105 | 60/794 |
| 3,974,645 A * | 8/1976 | Smith | F01K 23/105 | 60/794 |
| 3,975,900 A * | 8/1976 | Pfefferle | F23R 3/26 | 60/773 |
| 4,195,231 A * | 3/1980 | Reed | F01K 23/105 | 290/40 R |
| 4,809,497 A * | 3/1989 | Schuh | F02C 3/085 | 417/280 |
| 4,834,622 A * | 5/1989 | Schuh | F02C 3/085 | 415/27 |
| 5,174,105 A * | 12/1992 | Hines | F02C 3/10 | 60/774 |
| 6,226,974 B1 * | 5/2001 | Andrew | F02C 9/28 | 60/772 |
| 6,364,602 B1 * | 4/2002 | Andrew | F01D 21/10 | 415/1 |
| 6,735,955 B2 * | 5/2004 | Mannarino | F04D 27/0261 | 60/794 |
| 6,912,856 B2 * | 7/2005 | Morgan | F02C 9/28 | 60/39.281 |
| 7,100,357 B2 * | 9/2006 | Morgan | F02C 9/28 | 60/39.281 |
| 7,104,071 B2 * | 9/2006 | Braun | F02C 7/141 | 60/39.26 |
| 7,293,415 B2 * | 11/2007 | Hoffmann | F02C 7/057 | 60/39.27 |
| 7,422,414 B2 * | 9/2008 | Fujii | F02C 9/20 | 415/1 |
| 7,762,081 B2 * | 7/2010 | Williams | F01D 17/162 | 60/39.093 |
| 7,832,210 B2 * | 11/2010 | Fecamp | F23R 3/40 | 60/723 |
| 8,175,786 B2 * | 5/2012 | Nemet | F01D 17/16 | 415/116 |
| 8,302,405 B2 * | 11/2012 | Price | F01D 17/162 | 60/772 |
| 8,566,001 B2 * | 10/2013 | Stuttaford | F02C 7/1435 | 60/39.3 |
| 8,713,946 B2 * | 5/2014 | Botarelli | F02C 9/00 | 60/39.23 |
| 8,740,548 B2 * | 6/2014 | Rowe | F01D 17/162 | 415/1 |
| 8,826,670 B2 * | 9/2014 | Hoffmann | F02C 9/28 | 60/773 |
| 8,904,803 B2 * | 12/2014 | Botarelli | F23N 5/003 | 60/772 |
| 9,103,279 B2 * | 8/2015 | Zhang | F02C 9/00 | |
| 9,394,808 B2 * | 7/2016 | Brighenti | F01K 21/00 | |
| 9,970,360 B2 * | 5/2018 | Marini | F02C 9/20 | |
| 10,100,728 B2 * | 10/2018 | Sander | F02C 3/34 | |
| 10,247,109 B2 * | 4/2019 | Myoren | F02C 3/10 | |
| 10,323,570 B2 * | 6/2019 | Myoren | F02C 9/22 | |
| 2004/0055273 A1 * | 3/2004 | Hirayama | F02C 9/28 | 60/39.281 |
| 2005/0109033 A1 * | 5/2005 | Braun | F02C 7/141 | 60/772 |
| 2005/0131616 A1 * | 6/2005 | Fujii | F01D 15/10 | 701/100 |
| 2006/0010876 A1 * | 1/2006 | Hoffmann | F02C 7/057 | 60/773 |
| 2006/0042258 A1 * | 3/2006 | Gadde | F01D 17/162 | 60/772 |
| 2006/0220472 A1 * | 10/2006 | Fecamp | F23R 3/40 | 307/153 |
| 2007/0031238 A1 * | 2/2007 | Fujii | F02C 9/20 | 415/48 |
| 2007/0074516 A1 * | 4/2007 | Peck | F02C 9/18 | 60/772 |
| 2007/0089395 A1 | 4/2007 | Fujii et al. | | |
| 2009/0053036 A1 * | 2/2009 | Crawley | F02C 7/042 | 415/58.4 |
| 2009/0060707 A1 * | 3/2009 | Williams | F01D 17/162 | 415/48 |
| 2009/0138170 A1 * | 5/2009 | Nemet | F01D 17/16 | 701/100 |
| 2009/0150004 A1 | 6/2009 | Rofka et al. | | |
| 2009/0150040 A1 * | 6/2009 | Rofka | F02C 9/54 | 701/100 |
| 2009/0173078 A1 * | 7/2009 | Thatcher | F02C 9/20 | 60/773 |
| 2010/0005808 A1 * | 1/2010 | Nanataki | F02C 9/20 | 60/773 |
| 2010/0021285 A1 * | 1/2010 | Rowe | F01D 17/162 | 415/125 |
| 2010/0071372 A1 * | 3/2010 | Tanaka | F02C 7/047 | 60/730 |
| 2010/0175385 A1 * | 7/2010 | Plant | F02C 3/10 | 60/773 |
| 2010/0180604 A1 * | 7/2010 | Kawai | F23R 3/34 | 60/778 |
| 2010/0251727 A1 * | 10/2010 | Myers | F01K 13/02 | 60/773 |
| 2010/0281875 A1 * | 11/2010 | Price | F01D 17/162 | 60/772 |
| 2011/0016876 A1 * | 1/2011 | Cataldi | F02C 9/20 | 60/773 |
| 2011/0037276 A1 * | 2/2011 | Hoffmann | F02C 9/28 | 290/40 C |
| 2011/0142602 A1 * | 6/2011 | Adhami | F01D 17/162 | 415/159 |
| 2011/0265486 A1 * | 11/2011 | Plant | F02C 7/057 | 60/773 |
| 2011/0270503 A1 * | 11/2011 | Stuttaford | F02C 7/1435 | 701/100 |
| 2012/0259528 A1 * | 10/2012 | Minto | F04D 27/0246 | 701/100 |

(56) References Cited

U.S. PATENT DOCUMENTS

| | | | | |
|---|---|---|---|---|
| 2012/0279230 | A1* | 11/2012 | Botarelli | F02C 9/00 60/773 |
| 2013/0038072 | A1* | 2/2013 | Miller | F01D 17/162 290/40 B |
| 2013/0086883 | A1* | 4/2013 | Sander | F02C 3/34 60/39.52 |
| 2013/0125557 | A1* | 5/2013 | Scipio | F02C 9/18 60/773 |
| 2013/0219910 | A1* | 8/2013 | Botarelli | F23R 3/346 60/776 |
| 2013/0227954 | A1* | 9/2013 | Marini | F02C 9/54 60/773 |
| 2013/0239573 | A1* | 9/2013 | Brighenti | F01K 21/00 60/643 |
| 2013/0319009 | A1* | 12/2013 | Parente | F02C 7/057 60/805 |
| 2014/0121935 | A1* | 5/2014 | Zhang | F02C 9/00 701/100 |
| 2015/0308353 | A1* | 10/2015 | Gardner | F01D 17/162 60/773 |
| 2016/0245172 | A1* | 8/2016 | Myoren | F02C 9/22 |
| 2017/0284308 | A1* | 10/2017 | Myoren | F02C 3/10 |

FOREIGN PATENT DOCUMENTS

| | | |
|---|---|---|
| EP | 2249006 A1 | 11/2010 |
| JP | H0580580 A | 4/1993 |
| JP | H0882228 A | 3/1996 |
| JP | 2001200730 A | 7/2001 |
| JP | 2007040171 A | 2/2007 |
| JP | 2009138750 A | 6/2009 |
| JP | 2011032869 A | 2/2011 |
| JP | 2011513635 A | 4/2011 |
| JP | 2013174162 A | 9/2013 |
| WO | 2009109446 A1 | 9/2009 |

OTHER PUBLICATIONS

IPRP (PCT/IPEA/416), dated May 30, 2016, for PCT application No. PCT/EP2015/051107.

EP Search Report, dated Aug. 21, 2014, for EP application No. 14155549.0.

International Search Report dated Mar. 4, 2015, for PCT application No. PCT/EP2015/051107.

* cited by examiner

METHOD FOR OPERATING A GAS TURBINE INSTALLATION AND A GAS TURBINE INSTALLATION FOR CARRYING OUT THE METHOD

CROSS REFERENCE TO RELATED APPLICATIONS

This application is the US National Stage of International Application No. PCT/EP2015/051107 filed Jan. 21, 2015, and claims the benefit thereof. The International Application claims the benefit of European Application No. EP14155549 filed Feb. 18, 2014. All of the applications are incorporated by reference herein in their entirety.

FIELD OF INVENTION

The invention relates to a method for operating a gas turbine installation at a measured compressor input temperature and an almost constant turbine input temperature and an arrangement for operating the gas turbine installation having a functional unit and the above-mentioned gas turbine installation having a compressor, a turbine, a technical control system for operating the method according to the invention and having an above-mentioned arrangement.

BACKGROUND OF INVENTION

In order to achieve an increase of a degree of efficiency of a gas turbine, a pressure relationship and a turbine input temperature are constantly increased. With an increase of the pressure relationship, a turbine input temperature also increases constantly. The most critical aspect is a full-load operation at a warm location since the turbine input temperature increases with the compressor input temperature and consequently the ambient temperature. An operation of the gas turbine at excessively high temperatures may have disadvantageous effects on components of the gas turbine. In order to compensate for this, it is known to change to more temperature-resistant materials. However, this also increases the costs for components comprising these materials. This can be counteracted by a power output of the gas turbine at warm locations being reduced without the use of more expensive materials in order to maintain the turbine input temperature below a respective material limit. However, the degree of efficiency and consequently customer benefit is thereby reduced.

From the prior art, it is known in order to reduce the compressor input temperature during full-load operation of the gas turbine to provide special cooling devices, such as a so-called Evap-Cooler, a so-called Compressor Inlet Air Chiller (CIAC) or the so-called Wet-Compression. As a result of the addition of the cooling device during full-load operation, a high power can now be achieved. However, this may lead to an excess of power, whereby energy which is obtained is wasted in an unused state.

However, there is preferred for operating a gas turbine installation a method in which, during operation on hot days, a high degree of efficiency can also be achieved.

A starting point for this technical requirement can be provided by WO 2009/109446 in which an operating method of a gas turbine is described in which an almost constant turbine input temperature can be maintained by an increasing turbine output temperature being compensated for by a falling mass flow of compressor air. The almost constant turbine input temperature thus enables the implementation of a CO-optimized operation of the gas turbine.

In order to control the gas turbine according to this operating method, basic process variables according to WO 2009/109446 are used as control variables, in particular the turbine input temperature TIT at the input of the turbine. However, this can only be determined approximately by means of a large number of assumptions.

In this regard, it is also desirable to set out an operating method for a gas turbine during operation on hot days, which method can prevent these disadvantages from the prior art. In particular, the operating method using simple to detect variables should provide a simple criterion by means of which it is possible to decide at what time a corresponding operating method can be applied. This is an object of the present invention. Furthermore, an object of the invention is to provide an arrangement for operating the gas turbine installation with a functional unit in which a control/regulation of the gas turbine installation is accordingly possible in a satisfactory manner. Another object of the invention is to provide a corresponding gas turbine installation which can also be operated efficiently on hot days.

SUMMARY OF INVENTION

These objects are achieved according to the invention with a method, an arrangement and a gas turbine installation with the features of the independent claims. Advantageous embodiments and advantages of the invention will be appreciated from the additional claims and the description.

The invention is based on a method for operating a gas turbine installation at a compressor input temperature and an almost constant turbine input temperature.

It is proposed according to the invention that an increase of a calculated exhaust gas temperature be compensated for by a reduced mass flow of a flow medium which flows through a compressor of the gas turbine installation. Furthermore, there should be provision according to the invention for a compressor input temperature to be established by this being measured at the input of the compressor; this measured compressor input temperature is compared with a desired compressor input temperature and, in the event of a difference of the established compressor input temperature from the desired compressor input temperature, the compensation for the increased calculated exhaust gas temperature by the reduced mass flow of the flow medium is initiated. On the one hand, a prompt adaptation of the operating parameters to actual circumstances can thereby be achieved. On the other hand, the compressor input temperature is a variable which can be measured well and which enables a relatively reliable determination of an operating criterion by means of this variable which can be readily detected.

As a result of the method according to the invention, operating reliability, in particular at hot locations, can be increased in an advantageous and customer-friendly manner. As a result of the operating method implemented by the method according to the invention, it is possible to dispense with auxiliary technical means for cooling the compressor input temperature, which saves assembly complexity, space and costs. Furthermore, it can be ensured that the gas turbine installation is operated at the highest possible power, whereby a "wastage" of power is prevented. In addition, a conventional gas turbine installation can be operated with the method, whereby additional and expensive components can advantageously be saved. Furthermore, retrofitting of the conventional gas turbine installation can consequently be carried out in a simple and rapid manner. In addition, as a result of the substantially constant turbine input temperature, an increase of emissions, such as, in particular $NO_x$ or CO is prevented. Furthermore, as a result of the calculated exhaust gas temperature being increased, a damping of combustion chamber accelerations is possible without violating emission limits and wasting unnecessary additional power. Furthermore, components of the gas turbine installation, such as, for example, a housing or a rotor of a compressor of the gas turbine installation, may be produced from materials which are less temperature-resistant and consequently more cost-effective than components of temperature-resistant materials. In the method described in this instance, the absolute power of the gas turbine installation drops slightly but the degree of efficiency advantageously increases.

A gas turbine installation represents in this instance a succession of at least two component units. In this instance, the component unit may, for example, be a compressor, a burner unit or a turbine. In this context, a compressor input temperature is intended to be understood to be the temperature of a flow medium, such as, for example, air, which flows through at least the compressor of the gas turbine installation. This is referred to as an intake temperature.

According to the embodiment, the method according to the invention also relates in particular to increased compressor input temperatures. The term "increased" is intended in this instance to be understood to be a temperature which has a negative influence on the operating conditions of the gas turbine installation or one of the component units thereof.

This temperature limit will be determined independently by the person skilled in the art based on his technical knowledge. It is, for example, known with common gas turbine installations that effective, loss-free operation with a high degree of efficiency is intended to be enabled when the compressor input temperature is between 5° C. and 30° C.

The term "almost constant turbine input temperature" is intended to be understood to be a turbine input temperature range which deviates by a maximum of 15% about a mean value of the range, in particular by a maximum of 10% and more particularly by a maximum of 5%. In this context, the term "compensated for" is intended to be understood to mean "balanced" or "cancelled out" or that an effect caused by the reduction of the mass flow of the flow medium causes an effect which is compensated for, cancelled or negated by the increase of the calculated exhaust gas temperature. Ideally, this method also results in an operation with an almost constant power, wherein the above definition of "almost constant" is intended to be used in this instance in a similar manner.

It is further proposed that the gas turbine installation be operated at a compressor input temperature greater than 30° C. and in particular greater than 40° C. That is to say, the compressor input temperature is greater than 30° C. A method can thereby be provided which, at temperatures which normally influence the gas turbine installation in a negative manner, operates the gas turbine in an effective but nonetheless protective manner.

It is additionally conceivable for the compensation for the increase of the calculated exhaust gas temperature by the reduced mass flow to be initiated or operated at full load or part load of the gas turbine installation. The operation of the gas turbine installation can thereby be configured in a variable manner and adapted to the respective current requirement for power. Consequently, at an intake temperature of above 30° C. and, for example, a lower power requirement than at full load operation, the mass flow of the flow medium could be reduced, whereby the turbine input temperature is intentionally reduced, which leads to an advantageous reduction of the pollutant emissions, such as, for example, $NO_x$ or CO.

Advantageously, the reduction of the mass flow is brought about by means of an adjustment of at least one guide vane of the compressor. Consequently, the reduction of the mass flow can be carried out in a structurally simple, flexible and rapid manner. Advantageously, a large number of guide vanes are adjusted. As a result of the adjustment of the guide vane(s), an effective input face/input opening of the flow medium in the compressor is reduced. At full load operation or base load operation and during operation at intake temperatures of less than 30° C., a guide vane position is, for example, 100%, which corresponds to a maximum open position of the guide vanes or the input opening. This does not necessarily have to correspond to a maximum technically or structurally possible open position of the guide vane(s), but instead may also be a guide vane position which is determined for a specific operating type or operating mode of the gas turbine installation. If the compressor input temperature now increases above 30° C., and consequently also the calculated exhaust gas temperature, the guide vane position is lowered, for example, to 90%, whereby the turbine input temperature remains constant.

As a result of a linear heating of the calculated exhaust gas temperature with a turbine temperature, the increase of the calculated exhaust gas temperature is possible in a structurally simple manner when this is brought about by means of an increase of the turbine temperature. In principle, it would also alternatively and/or additionally be possible to use the so-called PZT (combustor primary zone temperature). The increase of the turbine temperature can in particular be carried out in a simple manner by the turbine temperature being brought about by an increase of a fuel supply of a fuel.

The desired compressor input temperature can be stored in a control unit and/or processing unit of the gas turbine installation (predeterminable compressor input temperature) or it can be established during operation of the gas turbine installation and used in situ (compressor input temperature which can be established). In this context and in the remaining text, the term "predeterminable" is also intended to be understood to mean "predetermined" and the term "established" is intended to be understood to mean "measured, determined or calculated". The desired compressor input temperature is, for example, a temperature ≤30° C. There is, for example, selected as a desired compressor input temperature a temperature which enables operating conditions which are harmless for the components located downstream. This may, for example, be dependent on leading load or temperature limits of a material of a component of the gas turbine installation, such as, for example, a housing or a rotor of the compressor.

Alternatively and/or additionally, it is advantageous for the compensation to be initiated when a predeterminable maximum turbine temperature and/or PZT is reached. This maximum temperature is dependent on the load limits of the components or the materials thereof in the burner unit. The prevailing turbine temperature and/or PZT could be established with a sensor in the burner unit. Since this is only possible with difficulty as a result of the high temperatures in the burner unit and there is a linear connection between the turbine temperature and the actual exhaust gas temperature, the prevailing turbine temperature and/or PZT can also be established by means of the actual exhaust gas temperature. An alternative or additional control possibility is thereby provided.

In principle, the new operating method thus differs from the current standard in that depending on the compressor input temperature and consequently the increased calculated exhaust gas temperature a new base load point is adjusted by a new guide vane position being adjusted, wherein this is smaller than 100% or smaller than the guide vane position with the previous base load point. That is to say, the raising of the part-load and base load ATK in accordance with the compressor input temperature in combination with the selected guide vane position achieves the power and efficiency guarantees which are intended to be complied with.

It is further proposed that value pairs which can be predetermined in order to change the calculated exhaust gas temperature be called up from a guide vane position and a fuel quantity in accordance with the compressor input temperature. The adaptation of the operation to changing or current circumstances can thereby be carried out in a prompt and precise manner. These value pairs are established in an empirical manner and stored in a value table in the control unit of the gas turbine installation. The values of the guide vane position and the fuel quantity or the calculated exhaust gas temperature were in this instance produced in each case as a separate polygon as a function of the intake temperature.

Advantageously, as a result of the compensation for the increased calculated exhaust gas temperature by the reduced mass flow of the flow medium, a cooling of the flow medium which is introduced into the gas turbine installation at the compressor inlet is replaced by a cooling device, such as, for example, an Evap-Cooler or a Compressor Inlet Air Chiller (CIAC). It is thereby possible to make savings in terms of assembly complexity, space and costs. If the cooling in systems of the prior art were to be produced, for example, by means of an Evap-Cooler or by means of Wet Compression, a high water demand would be necessary. The omission of the water cooling is consequently particularly advantageous in particular at arid locations.

In another embodiment, the compensation for the increased calculated exhaust gas temperature by the reduced mass flow of the flow medium is initiated and/or operated in oil pre-mixing operation. The compensation is thereby used in an operating mode of the gas turbine installation in which the installation is operated at high temperatures. The protection function of preventing excessively high operating temperatures thereby acts in a particularly effective manner in this instance.

In principle, the gas turbine installation can be operated in three different modes, in gas pre-mixing operation, in oil diffusion operation and in oil pre-mixing operation. This is dependent on the operating temperature and the fuel used and the automatic/manual selection of the operating mode of an operator. It is also possible to use the oil diffusion operation and the oil pre-mixing operation parallel with each other. It is even the case that the oil pre-mixing operation for reasons of stability is possible only as a combination of an active oil pre-mixing diffusion stage. In this instance, the oil diffusion mode is used in order to obtain a rapid hot flame which stabilizes the combustion process. The oil pre-mixing operation enables a permanent and clean combustion and consequently a low pollutant emission. With a combination of the modes, the advantages of both operating modes are combined, which results in a reliable and unsusceptible operation. A relationship of the two modes is determined independently by the person skilled in the art on the basis of his technical knowledge and may, for example, be 1:20, that is to say, 5% of the power of the gas turbine installation is obtained from the oil diffusion operation and 95% from the oil pre-mixing operation.

In another embodiment of the invention, there is provision for the relationship of the operation of the gas turbine installation in oil pre-mixing operation and the operation of the gas turbine installation in oil diffusion operation to be changed. Further fine tuning in the temperature control of the gas turbine installation can thereby be used, and advantageously results in an increase of the combustion stability. To this end, it is possible, for example, for there to be stored in the control unit a polygon which changes a relationship of the two part-stages (oil pre-mixing operation and oil diffusion operation) to the total quantity of fuel in accordance with the relative power or the total combustion desired value (relationship=UAOV=f(TVI, P) or relationship=UAOV=f (TVI, Y_min). This may if required lead to a corresponding loading or unloading of the gas turbine installation.

Alternatively and/or additionally, it may be advantageous for a diffusion advance quantity of a fuel mass flow to be adjusted in accordance with a standardized power of the gas turbine installation or in accordance with a total combustion desired value of the gas turbine installation. An additional variable adaptation possibility is thereby produced in order to obtain optimized operation of the gas turbine installation. The fuel mass flow of the oil diffusion stage is the mass flow which flows from the oil pump in the direction of the burner. The reflux is the quantity of oil which flows back into the collection container without being involved in the combustion. The difference of the two quantities is injected into the combustion chamber and represents the diffusion oil mass flow. For this purpose, there may also be stored in the control unit, for example, a polygon which adjusts the diffusion advance quantity of the fuel mass flow.

According to an advantageous embodiment, there is provision at a compressor input temperature of 30° C. for a predeterminable value pair comprising a guide vane position and a fuel quantity to be called up and at a compressor input temperature of 50° C. for a predeterminable value pair comprising a guide vane position and a fuel quantity to be called up and, at a compressor input temperature between 30° C. and 50° C., for a value pair comprising a guide vane position and a fuel quantity to be interpolated. The controls for different temperature ranges of the intake temperature are thereby clearly determined and separated from each other. In addition, a suitable value pair can be rapidly established. These benchmark points (compressor input temperature 30° C. and 50° C.) are in each case defined by means of polygons. The separate value pairs are stored in the control unit of the gas turbine installation.

It is further proposed that the method be used for exhaust-gas-related control and/or regulation taking into account the reduced mass flow of the flow medium and an increase of a turbine temperature. The gas turbine installation can thereby be controlled in a comfortable manner. The term "exhaust-gas-related control" is intended to be understood to mean that the control is carried out in accordance with the calculated exhaust gas temperature. The increase of the turbine temperature in this instance represents an additional peripheral condition.

Another development involves the method being used to control the calculated exhaust gas temperature, wherein in the method a control variable is the calculated exhaust gas temperature; actuating variables are a guide vane position and a fuel quantity and, by means of the reduction of the mass flow of the flow medium and an increase of the fuel quantity, a change of the control variable is brought about. It is thereby possible for operating parameters to be adapted in a selective and structurally simple manner to the circumstances of the gas turbine installation and the environment thereof.

The invention is further based on an arrangement, in particular a controller for operating a gas turbine installation having a functional unit which is configured in such a manner that the methods determined in this instance can be carried out.

As a result of the arrangement according to the invention, it is advantageously possible for reliable and customer-friendly operation to be ensured, particularly at warm locations. By means of the functional unit which is configured in this manner, a cooling of the compressor input temperature can be dispensed with, which saves assembly complexity, space and costs. It may additionally be made possible for the gas turbine installation to be operated at the highest possible power, whereby "wastage" of power is prevented. Furthermore, a conventional functional unit of a gas turbine installation can be retrofitted, whereby additional and expensive components can advantageously be saved. As a result of the substantially constant turbine input temperature, an increase of emissions, such as in particular $NO_X$ or CO, can also be prevented.

Advantageously, the functional unit has an establishment device which is configured in such a manner that the compressor input temperature can be established, whereby an ambient temperature or the intake temperature can be established in a structurally simple manner.

Furthermore, the functional unit has a control unit which is configured in such a manner that this compressor input temperature can be compared with a desired compressor input temperature and, in the event of a difference of the established compressor input temperature from the desired compressor input temperature, the compensation for the increased calculated exhaust gas temperature by the reduced mass flow of the flow medium can be initiated. It is thereby effectively made possible for the operation of the gas turbine installation to be adapted to prevailing circumstances.

The invention is further based on a gas turbine installation having at least a compressor, a turbine and having a technical control system in which at least the method according to the invention is implemented, and having an arrangement according to the invention.

As a result of the implementation according to the invention, it is advantageously possible to provide a gas turbine installation which is reliable to operate and which is customer-friendly. As a result of the method according to the invention which is implemented in the technical control system, a cooling of the compressor input temperature can be dispensed with, which saves assembly complexity, space and costs. Furthermore, the gas turbine installation can consequently be operated at the highest possible power level, whereby a "wastage" of power is prevented. In addition, the method can be implemented in a conventional technical control system of the gas turbine installation, whereby additional and expensive components can advantageously be dispensed with. Such a retrofitting operation may be carried out in a simple and rapid manner. In addition, as a result of the substantially constant turbine input temperature, an increase of emissions, such as, in particular $NO_x$ or CO, is prevented. Furthermore, as a result of the increase of the calculated exhaust gas temperature, a damping of combustion chamber accelerations is possible, without violating emission limits and wasting unnecessary additional power. Furthermore, components of the compressor line, such as, for example, a housing or a rotor, can be produced from less temperature-resistant materials and are consequently more cost-effective than components of temperature-resistant materials.

In this context, the term a "technical control system" is intended to be understood to be the controlling and/or regulating components, such as the control unit and/or processing unit, and the controlled and regulated components, such as the guide vane(s), a fuel valve or a sensor, of the gas turbine installation and an interaction of these components.

The gas turbine installation can further be operated in accordance with the method according to the invention.

BRIEF DESCRIPTION OF THE DRAWINGS

The above-described properties, features and advantages of this invention and the manner in which these are achieved will be appreciated more clearly and more plainly together with the following description of the embodiments, which are explained in greater detail in connection with the drawings, in which.

DETAILED DESCRIPTION OF INVENTION

Figure 1:
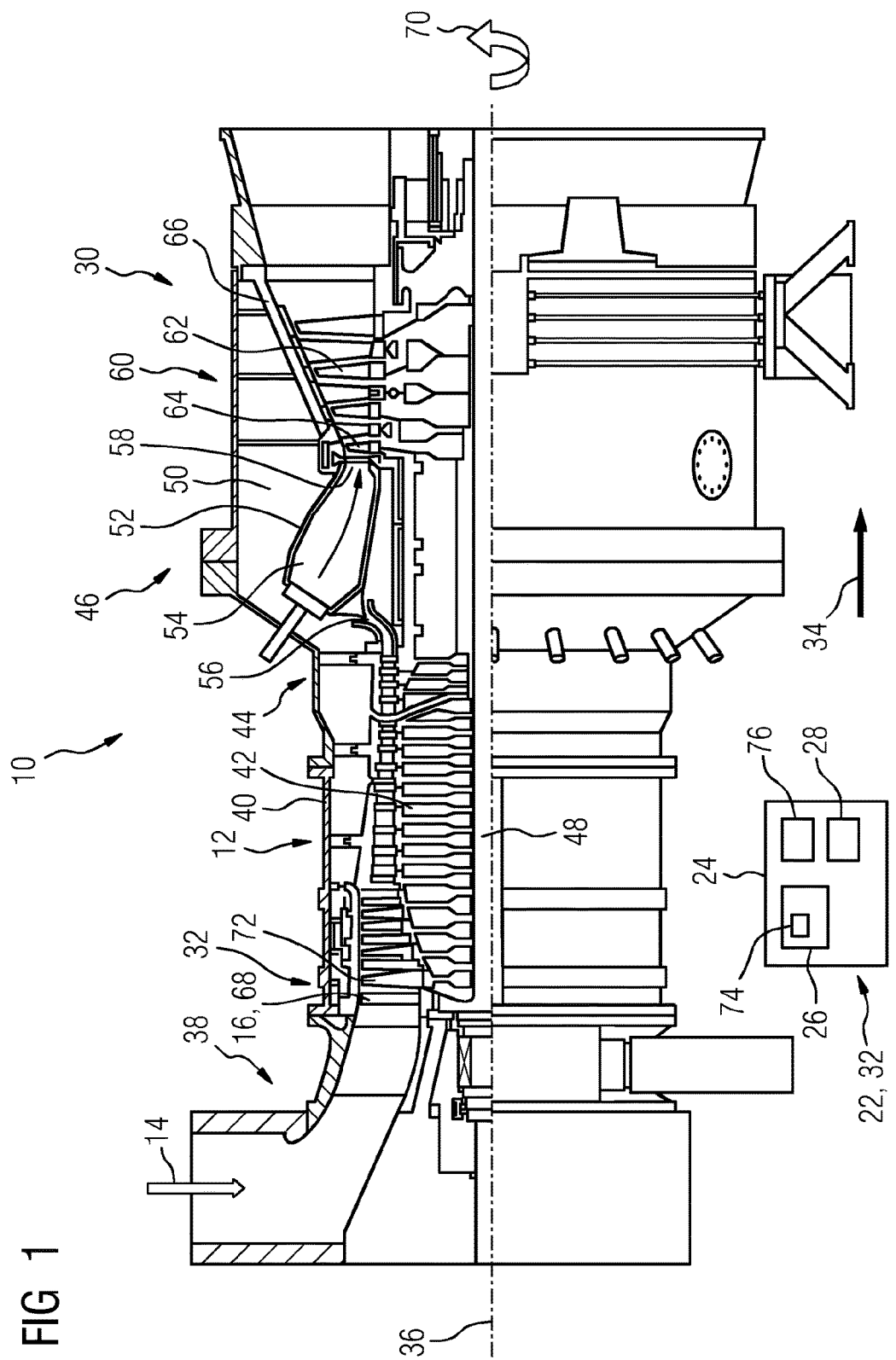
FIG. 1 is a section through a gas turbine installation according to the invention with an arrangement for controlling a calculated exhaust gas temperature.

FIG. 1 is a schematic illustration of a gas turbine installation 10. The gas turbine installation 10 has in the flow direction 34 a flow medium 14 such as, for example, air, or along a longitudinal axis or a rotation axis 36 a compressor input 38, a compressor unit or a compressor 12 with a housing 40 and a rotor 42, a compressor output 44, a burner unit 46 and a turbine 30. The gas turbine installation 10 additionally has a drive shaft 48 which can be rotated about the rotation axis 36 and which extends longitudinally along the gas turbine installation 10. The drive shaft 48 connects the turbine 30 to the compressor 12.

During operation of the gas turbine installation 10, the flow medium 14 flows in at the compressor input 38, is compressed in the compressor 12 and supplied via the compressor output 44 to the burner unit 46. The burner unit 46 has a burner space 50 having one or more burner chamber(s) 52 which each have a burner 54. The burner chamber(s) 52 and the burner(s) 54 are arranged in the burner space 50. The compressed flow medium 14 originating from the compressor 12 enters a diffuser 56 and is directed thereby into the burner chamber(s) 52, from where a portion is directed to the burner 54 and is mixed at that location with a gaseous or liquid fuel. The flow medium/fuel mixture is then burnt and the combustion gas or the working gas of the combustion is directed via a transition channel 58 to the turbine 30.

The turbine 30 has a plurality of turbine wheels 60 which are connected to the drive shaft 48 and which have turbine vanes 62. In addition, there are arranged axially between the turbine wheels 60 guide vanes 64 which in turn are connected to a stator 66 of the gas turbine installation 10. The combustion gas from the combustion chamber(s) 52 enters the turbine 30 and drives the turbine vanes 62 which in turn rotatably drive the drive shaft 48. The guide vanes 64 serve to optimize the angle with which the combustion gas or working gas strikes the turbine vanes 62. The compressor 12 has an axial succession of guide vanes 68 with a plurality of guide vanes 16 and turbine vane stages 72 which are arranged in the peripheral direction 70. These are driven by the turbine vanes 62 of the turbine 30 and consequently the drive shaft 48, whereby the compressed flow medium 14 is generated itself by the gas turbine installation 10 as soon as it is operational.

The gas turbine installation 10 further has a functional unit 24 in the form of a control unit which is shown for greater clarity in FIG. 1 outside the gas turbine installation 10. The functional unit 24 has an establishment device 26 with at least one sensor 74, such as, for example, a temperature sensor, a control unit 28 and a signal transmitter 76. The functional unit 24 serves inter alia to monitor the gas turbine installation 10, the components thereof and the flow medium 14 and in particular operating temperatures of the gas turbine installation 10.

Figure 2:
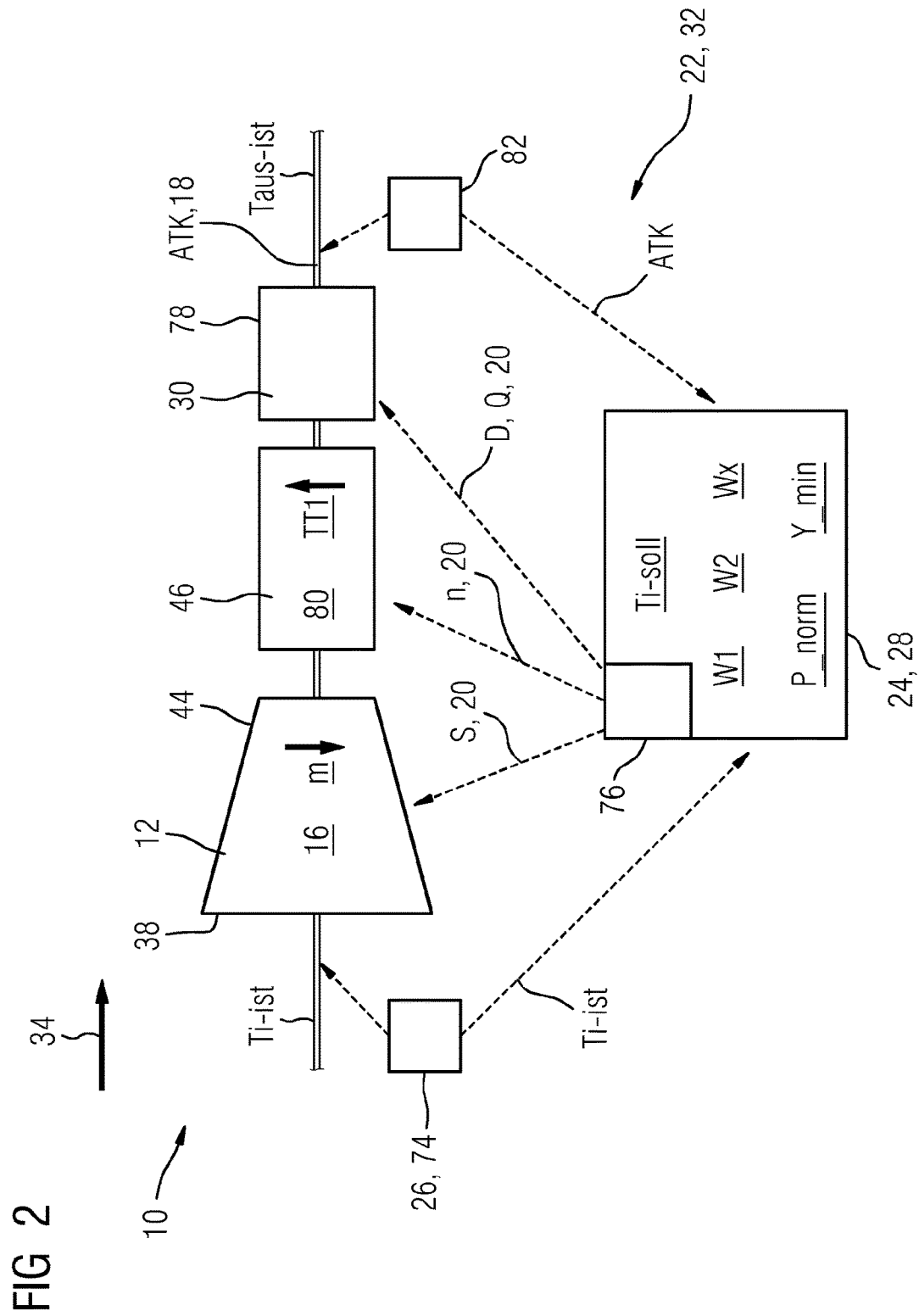
FIG. 2 is a schematic illustration of a control circuit of the arrangement of FIG. 1.

A control circuit of a method for operating the gas turbine installation 10 is shown in FIG. 2 and is described below. During operation of the gas turbine unit 10, the flow medium 14 is introduced from an environment of the gas turbine unit 10 not described in greater detail here into the compressor 12 with a compressor input temperature Ti-ist. This compressor input temperature Ti-ist is established by the establishment device 26 or the sensor 74 thereof and transmitted to the control unit 28.

The control unit 28 now compares this established compressor input temperature Ti-ist with a desired compressor input temperature Ti-soll which is, for example, stored in the functional unit 24. If it is determined that the established compressor input temperature Ti-ist differs from the desired compressor input temperature Ti-soll, a compensation for an increased calculated exhaust gas temperature ATK is initiated at a turbine output 78 with a reduced mass flow m of the flow medium 14. In this instance, the desired compressor input temperature Ti-soll is, for example, a temperature ≤30° C. and the established compressor input temperature Ti-ist is, for example, >30° C.

For the compensation for the increased calculated exhaust gas temperature ATK resulting from the compressor input temperature Ti-ist, the signal transmitter 76 activates, on the one hand, an activator (not shown) which adjusts the guide vanes 16 of the compressor 12 so that an effective input face of the flow medium 14 in the compressor 12 (not shown) is reduced and consequently the mass flow m of the flow medium 14 is lowered (indicated by the downward arrow at the reference numeral m in FIG. 2). On the other hand, the signal transmitter 76 activates an increase of the fuel quantity n of a fuel via, for example, a fuel valve 80 in the burner unit 46, whereby an increase of a turbine temperature TT1 in the burner unit 46 is carried out (indicated by the upward arrow at the reference numeral TT1 in FIG. 2).

To this end, predetermined value pairs comprising a guide vane position S and a fuel quantity n in accordance with the compressor input temperature Ti-ist which is >30° C. can be stored in a first value table in the control unit 28. Consequently, a second value table with predetermined value pairs comprising a guide vane position S and a fuel quantity n in accordance with the compressor input temperature Ti-ist which is ≤30° C. can further be stored in the control unit 28. This second value table is used during standard operation.

Advantageously, however, benchmark points of a temperature range which is to be anticipated for increased turbine input temperatures Ti-ist are stored in the control unit 28. That is to say that, for example, for a compressor input temperature Ti-ist of 30° C., a predeterminable value pair W1 comprising a guide vane position S and a fuel quantity n is stored and, for a compressor input temperature Ti-ist of 50° C., a predeterminable value pair W2 comprising a guide vane position S and a fuel quantity n is stored. If there occurs a compressor input temperature Ti-ist which is between the benchmark points or between 30° C. and 50° C., a value pair Wx comprising a guide vane position S and a fuel quantity n is interpolated.

Figure 3:
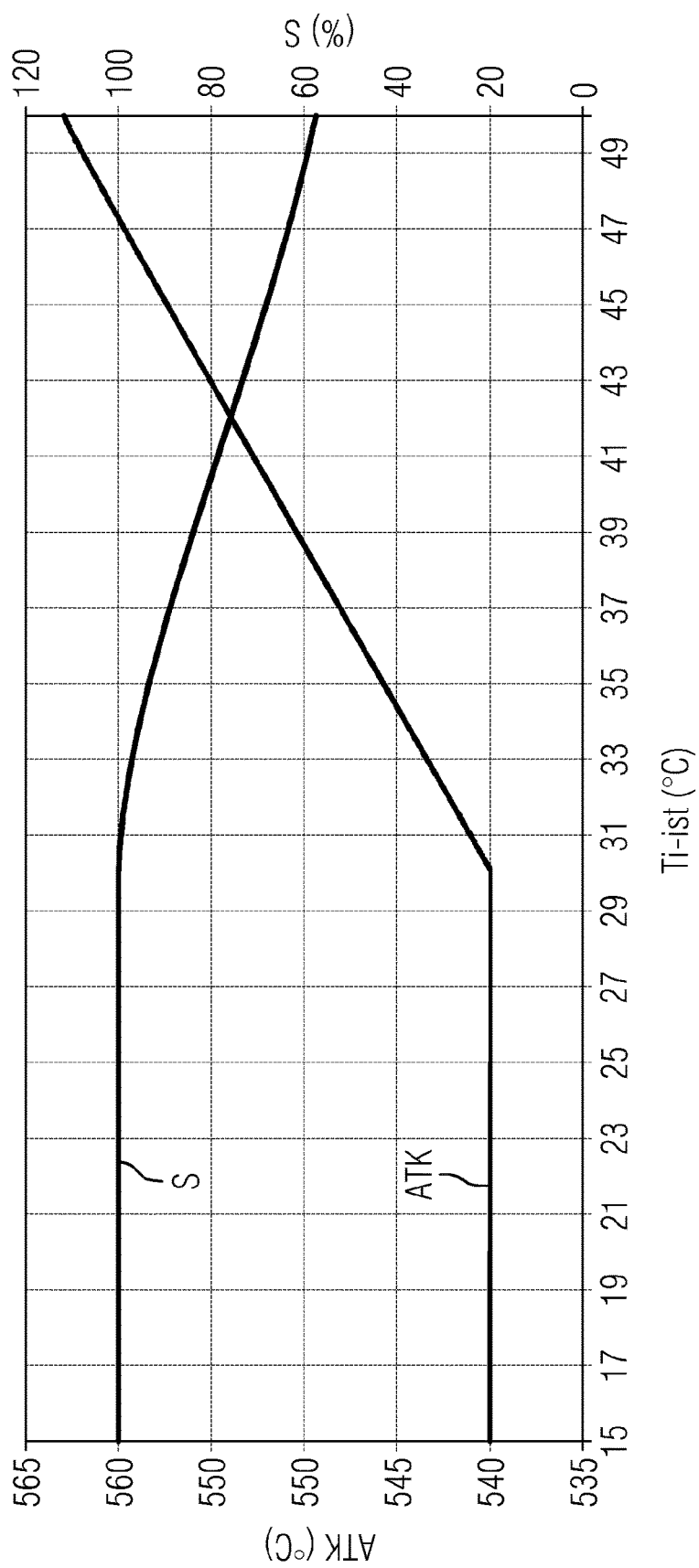
FIG. 3 is a chart showing polygons for the guide vane position and for the calculated exhaust gas temperature in accordance with the compressor input temperature.

These value pairs W1, W2, Wx can be derived from the chart of FIG. 3 which shows exemplary polygons for the guide vane position S and for the calculated exhaust gas temperature ATG which is a measurement for the fuel supply n, in accordance with the compressor input temperature Ti-ist. In this instance, the calculated exhaust gas temperature ATK in ° C. is indicated on the left Y axis, the guide vane position S in % is indicated on the right Y axis and the compressor input temperature Ti-ist in ° C. is indicated on the X axis. The upper line represents the values of the guide vane position S and the lower line represents the values of the calculated exhaust gas temperature ATK.

As can be seen from the chart of FIG. 3, the value pairs for compressor input temperatures Ti-ist are less than 30° C., that is to say, the normal operation of the gas turbine installation 10, by way of example a guide vane position S of 100% (upper line) and a calculated exhaust gas temperature ATK of 440° C. (lower line). If the compressor input temperature Ti-ist increases, the guide vane position S continuously reduces and the calculated exhaust gas temperature ATK increases continuously. At a compressor input temperature Ti-ist of, for example, 45° C., the guide vane position S is approximately 68% and the calculated exhaust gas temperature ATK is 555° C.

For additional monitoring of the operating conditions of the gas turbine installation 10, it has an additional sensor 82 which measures the actual exhaust gas temperature Taus-ist and transmits this to the control unit 28 (see FIG. 2). If this exceeds, for example, temperature limits previously stored in the control unit 28, for example, of different components of the gas turbine installation 10, additional measures can be taken to change the operating method of the gas turbine installation 10 (not shown).

The functional unit 24 represents an arrangement 22 or a controller for exhaust-gas-related control of a calculated exhaust gas temperature ATK. A resultant method is consequently used to control the calculated exhaust gas temperature ATK taking into account the reduced mass flow m of the flow medium 14 and the increase of the turbine temperature TT1.

Consequently, the calculated exhaust gas temperature ATK represents a control variable 18 and the guide vane position S and the fuel quantity n represent a control variable 20, wherein, by means of the reduction of the mass flow m of the flow medium 14 and the increase of the fuel quantity n, a change of the control variable 18 is brought about. The arrangement 22 or the control unit 28 acting as controlling and/or regulating components and the guide vanes 16, the fuel valve 80 and the sensors 74, 82 acting as controlled or regulated components form a technical control system 32.

The compensation for the increased calculated exhaust gas temperature ATK by the reduced mass flow m of the flow medium 14 is in particular initiated or operated in oil pre-mixing operation of the gas turbine installation 10. The method can be configured in a particularly flexible manner if a relationship Q (Q=UAOV=f(Ti-ist, Y_min)) of the operation of the gas turbine installation 10 is changed during oil pre-mixing operation and an operation of the gas turbine installation 10 is changed during oil diffusion operation. In oil pre-mixing operation, the oil pre-mixing stage and the oil diffusion stage are active, in contrast in oil diffusion operation only the oil diffusion stage is active. In addition, it is possible for a diffusion advance quantity D of a fuel mass flow to be adjusted in accordance with a standardized power P_norm of the gas turbine installation 10 or in accordance with a total combustion desired value Y_min of the gas turbine installation 10. Consequently, the relationship Q of the operating modes and the diffusion advance quantity D also represent control variables 20.

It is additionally conceivable for the compensation for the increase of the calculated exhaust gas temperature ATK by the reduced mass flow m of the flow medium to be initiated or operated at full load or at part load of the compressor line 10.

As a result of the control described in this instance, at a compressor input temperature Ti-ist of >30° C., an operation of the gas turbine installation 10 with an almost constant turbine input temperature TiTiso can be carried out.

Figure 4:
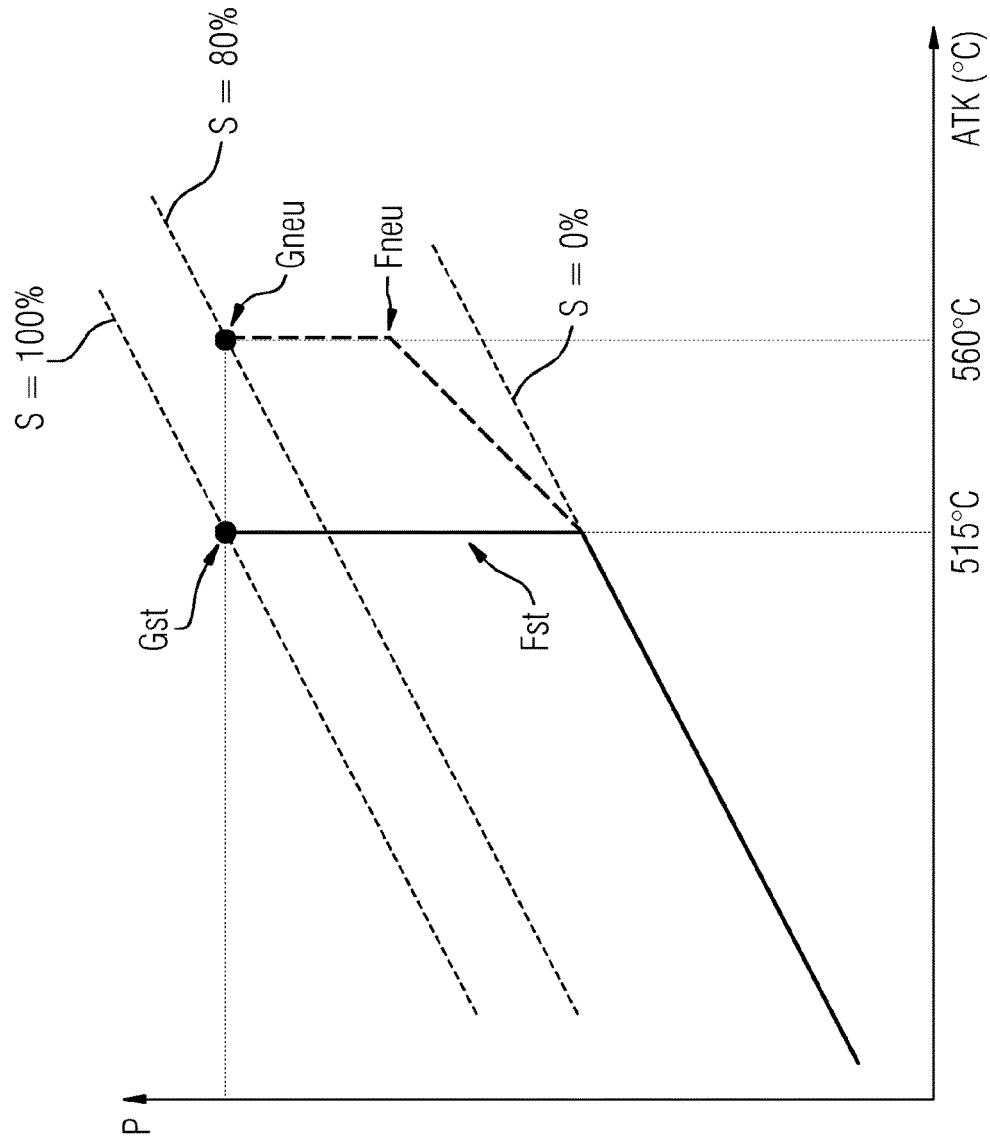
FIG. 4 is a chart showing a first operating method according to the invention of the gas turbine installation of FIG. 1 in comparison with an operating method according to a method of the prior art.
Figure 5:
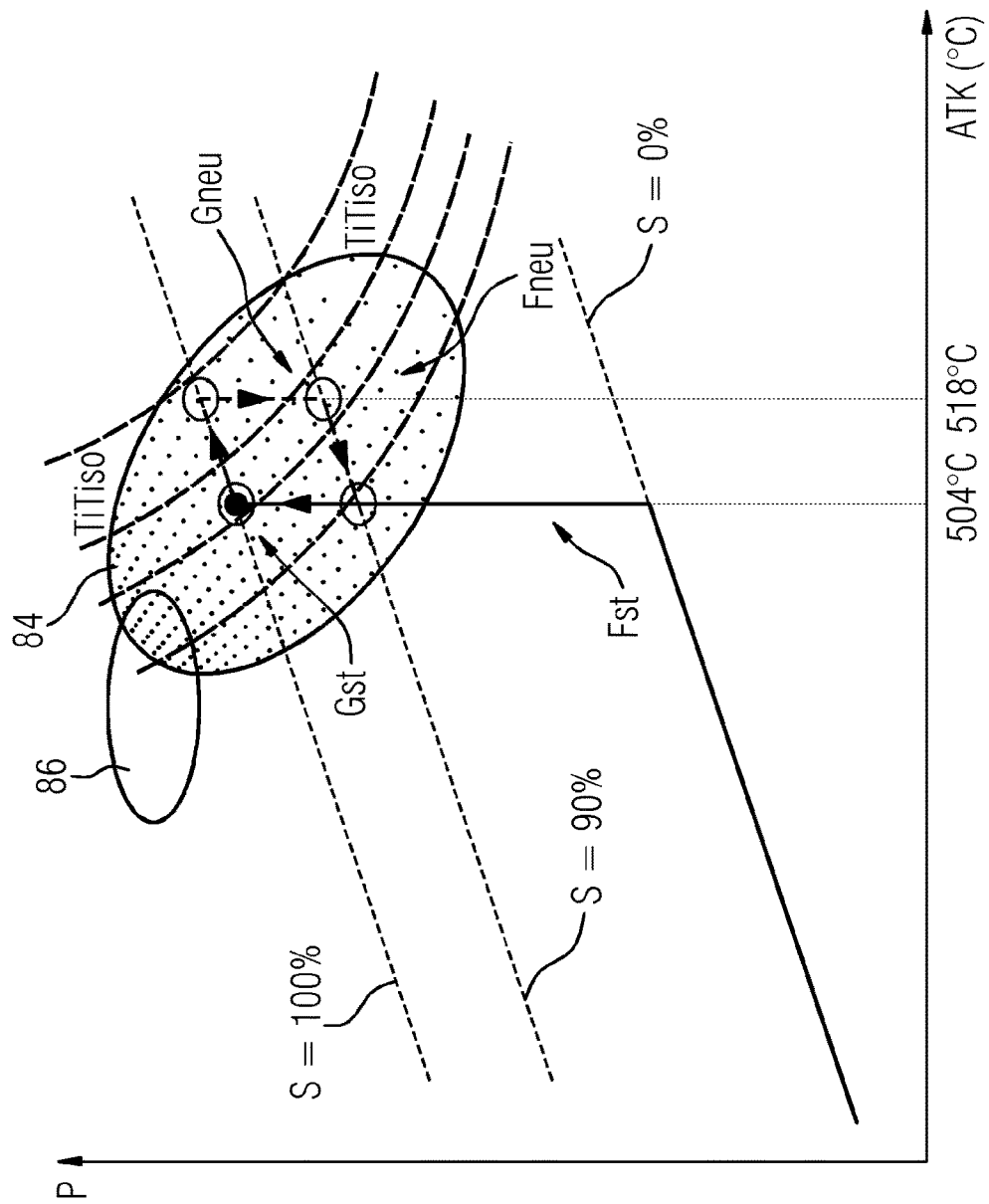
FIG. 5 is a chart showing a second operating method according to the invention of the gas turbine installation of FIG. 1 in comparison with an operating method according to a method of the prior art.

FIGS. 4 and 5 show two exemplary operating methods of the gas turbine installation 10 according to the method according to the invention in comparison with a method according to the prior art. In this instance, the power P is indicated on the Y axis and the calculated exhaust gas temperature ATK in C.° is indicated on the X axis.

The three straight lines represent the guide vane position S for three different positions, that is to say, 100%, 80% and 0% in FIG. 4 and 100%, 90% and 0% in FIG. 5. In FIG. 5, there are additionally shown four curved paths for different turbine input temperatures TiTiso, wherein the uppermost curve represents the highest TiTiso and the lower curve represents the lowest TiTiso. Furthermore, an experimentally established range 84 of combustion chamber accelerations is illustrated as an oval with a differently densely dotted extent and an experimentally established range 86 of 90 Hertz (Hz) oscillations is illustrated as an open oval (for details see below).

With respect to FIG. 4, the left polygon shows the exemplary standard operating method Fst according to the prior art. In this instance, at a calculated exhaust gas temperature ATK, for example, less than 515° C., a guide vane position S is 0%, wherein the power P constantly increases with the calculated exhaust gas temperature ATK. If the guide vane position S is at 0%, a further load reduction can be carried out only by reducing the calculated exhaust gas temperature ATK. This is conventionally still carried out only in oil diffusion operation. If the calculated exhaust gas temperature ATK reaches a temperature in this instance of 515° C., the guide vane position S is set at 100%, whereby the power P increases. This now corresponds to the base load operation with a standard base load point Gst.

The right polygon shows the new operating method according to the method according to the invention by way of example at an increased turbine input temperature Ti-ist of 45° C. Until the temperature 515° C. is reached and the guide vane position S of 0% is set, this operating method Fneu corresponds to the operating method Fst of the prior art (Ti-ist ≤30°). Based on this, the gas turbine installation 10 can be further loaded by the guide vane position S being constantly increased (cf. increase of the polygon in FIG. 4), whereby the power P increases. Depending on the prevailing turbine input temperature Ti-ist, the associated calculated exhaust gas temperature ATK is now established (for example, 515° C. for Ti-ist ≤30° C. and 560° C. for Ti-ist ≤50° C., therebetween is interpolated). Depending on the established calculated exhaust gas temperature ATK or at an ATK of >30° C., the associated interpolated guide vane positions S is now set. Consequently, the increase of the calculated exhaust gas temperature ATK is compensated for by the reduction of the mass flow m.

This takes place during the loading operation until a new base load point Gneu is reached which is, for example, at a guide vane position S of 80%. The standard base load point Gst is at TCI≤30° C. at a guide vane position S of 100% and a calculated exhaust gas temperature ATK of 515° C. The new base load point Gneu is in contrast at TCI≤50° C. at a guide vane position S of <100% (in this instance by way of example 80%) and a calculated exhaust gas temperature ATK of >515° C. (in this instance by way of example 560° C.). This is produced depending on the parameterization of the associated polygon. If the gas turbine installation 10 is constantly operated at base load and if the turbine input temperature Ti-ist changes, the guide vane position S and the calculated exhaust gas temperature ATK are controlled in the same manner as shown in FIG. 3. According to the operating method shown in FIG. 4 by way of example, at the new base load point Gneu the same power P is applied as during operation at the standard base load point Gst according to the standard operating method Fst.

The left polygon in FIG. 5 again shows the standard operating method Fst according to the prior art. If, in this example, the calculated exhaust gas temperature ATK reaches a temperature of 504° C., the guide vane position S is set from 0% to 100%, whereby the power P at the standard base load point Gst increases (first circle in the parallelogram). If the calculated exhaust gas temperature ATK now increases, the power P and TiTiso (second circle in the parallelogram) also increase.

If the compressor input temperature Ti-ist now exceeds 30° C. (ATK>30° C.), which in the present example corresponds to a calculated exhaust gas temperature ATK of 518° C., this increase is compensated for by the adjustment of the guide vane position S at 90% and consequently by the reduction of the mass flow m. This now corresponds to a new base load point Gneu (third circle in the parallelogram). This new base load point Gneu is at approximately the same turbine input temperature TiTiso line as the standard base load point Gst.

If the calculated exhaust gas temperature ATK now drops as a result of a reduced compressor input temperature Ti-ist, in the event of a lack of counter-control the turbine input temperature TiTiso and the power P would be reduced (fourth circle in the parallelogram). According to the new operating method, however, this point is not reached since the guide vane position S is increased in parallel with the decrease of the calculated exhaust gas temperature ATK in the event of a falling turbine input temperature Ti-ist (not shown); that is to say, point 1 is proceeded to from point 3. The new base load point Gneu is in this example, as set out above, point 3 for Ti-ist>30° C. with an absolute power drop, but a gain in the degree of efficiency (cf. power P for Gst and Gneu).

The new operating method Fneu with the operation at the new base load point Gneu also has the decisive advantage that in this instance fewer combustion chamber accelerations occur than in the standard operating method Fst. As can be seen with reference to the density distribution of the points of the range 84, weak and non-harmful combustion chamber accelerations occur at a calculated exhaust gas temperature ATK of above approximately 520° C. (sparsely dotted region 84). The higher the power P of the gas turbine installation 10 is raised, and the further the calculated exhaust gas temperature ATK is lowered, and at a maximum at approximately 500° C., critical combustion chamber accelerations occur (densely dotted region 84). The new base load point Gneu is consequently in the range of the weak and harmless combustion chamber accelerations.

Consequently, as a result of the increase of the calculated exhaust gas temperature ATK, a damping of combustion chamber accelerations is possible without violating emission limits and wasting unnecessary additional power. It is thereby possible to comply with the required power and emission guarantees which are decisive for a reliable and customer-friendly operation of the gas turbine installation 10.

The new base load point Gneu with respect to 90 Hz oscillations is also in a less critical range than the standard base load point Gst since increased and damaging 90 Hz oscillations occur in a range of the calculated exhaust gas temperature ATK of approximately 480° C. and 500° C. (cf. range 86).

Although the invention has been illustrated and described in greater detail by the preferred embodiments, the invention is not limited by the disclosed examples and other variations can be derived therefrom by the person skilled in the art, without departing from the protective scope of the invention.

The invention claimed is:

1. A method for operating a gas turbine installation at a compressor input temperature (Ti-ist) and an almost constant turbine input temperature (TiTiso), the method comprising:
   detecting the compressor input temperature (Ti-ist) is equal to or above a threshold temperature;
   compensating for an increase of a calculated exhaust gas temperature (ATK) when the compressor input temperature (Ti-ist) is equal to or above the threshold temperature by effecting a reduced mass flow (m) of a flow medium which flows through a compressor of the gas turbine installation, by
   measuring the compressor input temperature (Ti-ist);
   comparing the compressor input temperature (Ti-ist) with a desired compressor input temperature (Ti-sol),
   determining a difference between the compressor input temperature (Ti-ist) and the desired compressor input temperature (Ti-soll),
   effecting the reduced mass flow of the flow medium in response to the difference by adjusting at least one guide vane of the compressor to a more closed position; and
   wherein predetermined and stored value pairs (W1, W2, Wx) correlate a respective guide vane position (S) and a respective fuel quantity (n) for various compressor input temperatures (Ti-ist) equal to or above the threshold temperature, and wherein the adjustment moves the at least one guide vane to the respective guide vane position (S) associated with the compressor input temperature (Ti-ist).

2. The method as claimed in claim 1,
   wherein the compressor input temperature (Ti-ist) is greater than 30° C. and the desired compressor input temperature (Ti-soil) is less than or equal to 30° C.

3. The method as claimed in claim 1,
   wherein an increase of the calculated exhaust gas temperature (ATK) is brought about by an increase of a turbine temperature (TT1).

4. The method as claimed in claim 3,
   wherein the turbine temperature (TT1) is brought about by an increase of a fuel quantity (z) of a fuel.

5. The method as claimed in claim 1,
   wherein effecting the reduced mass flow (m) of the flow medium is initiated in fuel pre-mixing operation of the gas turbine installation.

6. The method as claimed in claim 1, further comprising:
   changing a relationship (Q) of an operation of the gas turbine installation in premix combustion operation and an operation of the gas turbine installation in diffusion combustion operation.

7. The method as claimed in claim 1, further comprising:
   adjusting a quantity (D) of a fuel mass flow in accordance with a standardized power (P_norm) of the gas turbine installation.

8. The method as claimed in claim 1,
   wherein for a first compressor input temperature (Ti-ist1) there exists a first predetermined and stored value pair (W1) comprising a first guide vane position (S1) and a first fuel quantity (n1),
   wherein for a second compressor input temperature (Ti-ist2) there exists a second predetermined and stored value pair (W2) comprising a second guide vane position (S2) and a second fuel quantity (n2),
   the method further comprising:
   ascertaining the first predetermined and stored value pair (W1) to determine the first guide vane position (S1) when the compressor input temperature (Ti-ist) equals the first compressor input temperature (Ti-ist1), wherein the adjustment moves the at least one guide vane to the first guide vane position (S1),
   ascertaining the second predetermined and stored value pair (W2) to determine the second guide vane position (S2) when the compressor input temperature (Ti-ist) equals the second compressor input temperature (Ti-ist2), wherein the adjustment moves the at least one guide vane to the second guide vane position (S2), and
   interpolating a respective interpolated value pair Wx comprising a respective guide vane position (Sr) and a respective fuel quantity (nr) for the compressor input temperature (Ti-ist) from the first predetermined and stored value pair (W1) and the second predetermined and stored value pair (W2) when compressor input temperatures (Ti-ist) is between the first compressor input temperature (Ti-ist1) and the second compressor input temperature (Ti-ist2), wherein the adjustment moves the at least one guide vane to the respective guide vane position (Sr).

9. The method as claimed in claim 8, wherein the first compressor input temperature (Ti-ist1) is 30° C.

10. The method as claimed in claim 9, wherein the second compressor input temperature (Ti-ist2) is 50° C.

11. The method as claimed in claim 1, further comprising:
    controlling the calculated exhaust gas temperature (ATK), wherein
    a control variable is the calculated exhaust gas temperature (ATK);
    actuating variables are the guide vane position (S) and a fuel quantity (n) and,
    changing the control variable by means of the reduced mass flow (m) of the flow medium and an increase of the fuel quantity (n).

12. An arrangement for operating a gas turbine installation, comprising:
a functional unit which is configured to carry out the method as claimed in claim 1.

13. The arrangement as claimed in claim 12, wherein the functional unit comprises an establishment device and a control unit.

14. A gas turbine installation, comprising:
at least a compressor,
a turbine, and
a technical control system configured to carry out the method of claim 1.

15. A method for operating a gas turbine installation at a compressor input temperature (Ti-ist) and an almost constant turbine input temperature (TiTiso), the method comprising:
determining a position of compressor inlet guide vanes up to base load using a standard schedule during standard operation, wherein the standard operation occurs when the compressor input temperature (Ti-ist) is below a threshold temperature;
determining the position of the inlet guide vanes up to the base load using a second schedule different than the standard schedule during a secondary operation, wherein the secondary operation occurs when the compressor input temperature (Ti-ist) is equal to or above the threshold temperature;
operating the gas turbine installation at the secondary operation, comprising:
compensating for an increase of a calculated exhaust gas temperature (ATK) during the secondary operation by effecting a reduced mass flow (m) of a flow medium which flows through a compressor of the gas turbine installation, by
measuring the compressor input temperature (Ti-ist);
comparing the compressor input temperature (Ti-ist) with a desired compressor input temperature (Ti-soll);
determining a difference between the compressor input temperature (Ti-ist) and the desired compressor input temperature (Ti-soll); and
effecting the reduced mass flow of the flow medium in response to the difference by moving the inlet guide vanes to a more closed position; and
wherein the second schedule comprises predetermined and stored value pairs (W1, W2, Wx) that correlate a respective guide vane position (S) and a respective fuel quantity (n) for various compressor input temperatures (Ti-ist) equal to or above the threshold temperature, and wherein the moving the inlet guide vanes to a more closed position includes moving the inlet guide vanes to the respective guide vane position (S) associated with the compressor input temperature (Ti-ist).

16. A method for operating a gas turbine installation at a compressor input temperature (Ti-ist) and an almost constant turbine input temperature (TiTiso), the method comprising:
compensating for an increase of a calculated exhaust gas temperature (ATK) by effecting a reduced mass flow (m) of a flow medium which flows through a compressor of the gas turbine installation, by
measuring the compressor input temperature (Ti-ist);
comparing the compressor input temperature (Ti-ist) with a desired compressor input temperature (Ti-soil) and,
determining a difference between the compressor input temperature (Ti-ist) and the desired compressor input temperature (Ti-soil), and initiating a compensation for an increased calculated exhaust gas temperature (ATK) by effecting the reduced mass flow of the flow medium in response to the difference,
wherein the reduced mass flow (m) is brought about by an adjustment of at least one guide vane of the compressor,
wherein for a first compressor input temperature (Ti-ist1) there exists a first predetermined and stored value pair (W1) comprising a first guide vane position (S1) and a first fuel quantity (n1),
wherein for a second compressor input temperature (Ti-ist2) there exists a second predetermined and stored value pair (W2) comprising a second guide vane position (S2) and a second fuel quantity (n2),
the method further comprising:
ascertaining the first predetermined and stored value pair (W1) to determine the first guide vane position (S1) when the compressor input temperature (Ti-ist) equals the first compressor input temperature (Ti-ist1), wherein the adjustment moves the at least one guide vane to the first guide vane position (S1),
ascertaining the second predetermined and stored value pair (W2) to determine the second guide vane position (S2) when the compressor input temperature (Ti-ist) equals the second compressor input temperature (Ti-ist2), wherein the adjustment moves the at least one guide vane to the second guide vane position (S2), and
interpolating a respective interpolated value pair Wx comprising a respective guide vane position (Sr) and a respective fuel quantity (nr) for the compressor input temperature (Ti-ist) from the first predetermined and stored value pair (W1) and the second predetermined and stored value pair (W2) when compressor input temperatures (Ti-ist) is between the first compressor input temperature (Ti-ist1) and the second compressor input temperature (Ti-ist2), wherein the adjustment moves the at least one guide vane to the respective guide vane position (Sr).

* * * * *